(12) United States Patent
Chiang et al.

(10) Patent No.: US 10,186,865 B2
(45) Date of Patent: Jan. 22, 2019

(54) INTELLIGENT CHARGING DEVICE AND CHARGE SCHEDULING CONTROL METHOD THEREOF

(71) Applicant: Aver Information Inc., New Taipei (TW)

(72) Inventors: Jui-Hsuan Chiang, New Taipei (TW); Lien-Kai Chou, New Taipei (TW); Chao-Hung Chang, New Taipei (TW); Chi-Fa Hsu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 332 days.

(21) Appl. No.: 14/942,322

(22) Filed: Nov. 16, 2015

(65) Prior Publication Data

US 2016/0211676 A1    Jul. 21, 2016

(30) Foreign Application Priority Data

Jan. 19, 2015 (TW) .............................. 104101617 A

(51) Int. Cl.
*H02J 3/14* (2006.01)
*H02J 7/00* (2006.01)
*H02J 7/02* (2016.01)

(52) U.S. Cl.
CPC ............... *H02J 3/14* (2013.01); *H02J 7/0013* (2013.01); *H02J 7/02* (2013.01); *Y02B 40/90* (2013.01); *Y02B 70/3225* (2013.01); *Y04S 20/222* (2013.01)

(58) Field of Classification Search
CPC ... H02J 3/14; H02J 7/0013; H02J 7/02; Y02B 70/3225; Y02B 40/90; Y04S 20/222

USPC ........................................................ 320/107
See application file for complete search history.

(56) References Cited

U.S. PATENT DOCUMENTS

2011/0181108 A1   7/2011  Cohen et al.
2012/0173033 A1*  7/2012  Tischer ..................... H02J 3/14
                                                    700/295

FOREIGN PATENT DOCUMENTS

| CN | 101989669 A | 3/2011 |
| TW | I299933 | 3/1997 |
| TW | 200842565 A | 11/2008 |
| TW | 200929894 A | 7/2009 |

* cited by examiner

*Primary Examiner* — Edward Tso
*Assistant Examiner* — Manuel Hernandez
(74) *Attorney, Agent, or Firm* — Muncy, Geissler, Olds & Lowe, P.C.

(57) ABSTRACT

An intelligent charging device has a control unit and multiple power strips respectively connected to and simultaneously charging multiple sets of digital devices. Each power strip has a relay connected to the control unit. When acquiring load signals of the power strips and a maximum load threshold, the control unit performs a charging schedule configuration to generate a charging demand sequence, and then calculates a charging time for each charging schedule of a charging cycle according to the charging demand sequence and the load signals of the multiple power strips for charging time allocation and instructs each power strip to charge for a corresponding charging time in a corresponding charging schedule, thereby allowing the power strip with the maximum charging demand to charge first and achieving the goal of efficiency charging.

16 Claims, 5 Drawing Sheets

INTELLIGENT CHARGING DEVICE AND CHARGE SCHEDULING CONTROL METHOD THEREOF

BACKGROUND OF THE INVENTION

1. Field of the Invention

The present invention relates to a charging device, and, more particularly, to an intelligent charging device and a charge scheduling control method thereof.

2. Description of the Related Art

Nowadays, owing to rapid technological progress and uprising awareness of environmental protection, many education institutions have gradually introduced digital devices into teaching environments to fulfill paperless pursuit and development of learning interest. The digital devices include tablet personal computer (PC), chromebook, notebook computer, and the like. When applied to a teaching environment, those digital devices acquire power from batteries thereof for operation. Therefore, a charging device, such as a charge and sync dock provided by current education institutions can accommodate and simultaneously charge tens of digital devices, such as 30 to 50 digital devices. However, the charge current (load current) required by tens of digital devices upon the simultaneous charging may overload a power distribution system, which supplies power to the charging device, and thus affect other power-consuming devices connected to the power distribution system.

The aforementioned charging device can have charging schedules designed as follows: 1. automatically and alternately charge equipment in divided charge zones according to a charge sequence and a fixed charge time for each divided charge zone; 2. manually and alternately charge equipment in divided charge zones according to a charge sequence and a fixed charge time for each divided charge zone. Given different divided charge zones, excessively large charge current can be avoided and the power distribution system can be thus prevented from being overloaded. For example, a charging device can accommodate 40 digital devices at the same time and the 40 digital devices can be divided into 4 charge zones, that is, each charge zone having 10 corresponding digital devices. The charging device can only charge the digital devices in one charge zone at a time for the fixed charge time. After the fixed charge time expires, the charging device charges the digital devices in the next charge zone in the charge sequence.

From the foregoing, the conventional charge schedule design must presume the power utilization condition in each charge zone is even and normal, such that alternately charging the digital devices in the divided charge zones will not overload the power distribution system. However, practically, the way of alternately charging the divided charge zones with a fixed charge time allocated to each charge zone is not efficient as the power utilization conditions may vary from charge zone to charge zone and may even have dramatically different electricity usage. Therefore, the overload issue of the power distribution system still remains. As the manual way of setting the charge sequence and the charge time, users must take the power utilization condition of each charge zone into account, rendering an inefficient charge means with more operational inconvenience to users.

SUMMARY OF THE INVENTION

An objective of the present invention is to provide an intelligent charging device and a charging scheduling control method avoiding power distribution system to be overloaded, requiring no manual setting, allowing simultaneous charging and sharing charging time with each charging zone to be charged at least once during each charging cycle and the charging zone with the maximum charging demand to be charged first, and minimizing charging time to enhance charging efficiency.

To achieve the foregoing objective, the intelligent charging device has a control unit and multiple power strips, each power strip has a relay connected to a control unit, the control unit activates or deactivates the relays of the multiple power strips, and the charge scheduling control method is performed by the control unit of the intelligent charging device and has steps of:

acquiring multiple load signals of the multiple power strips and a maximum load threshold;

performing a charging schedule configuration to generate a charging demand sequence of the multiple power strips for charging in multiple charging schedules of a charging cycle corresponding to a count of the multiple power strips; and calculating a charging time for each charging schedule of the charging cycle according to the charging demand sequence and the multiple load signals of the multiple power strips, and instructing the multiple power strips to charge according to the charging demand sequence and the charging time.

From the foregoing method, the control unit activates or deactivates the relays to turn on or off the power strips, receives the load signals of the power strips, performs a charging schedule configuration to generate a charging demand sequence, calculates a charging time for each charging schedule of a charging cycle, and allocates a corresponding charging time to the power strips of each power strip combination for a corresponding charging schedule of the charging cycle for the power strips in the power strip combination to charge for the corresponding time. Accordingly, the charge scheduling control method ensures that power strips with large charging demand have higher priority to charge first and thus enhances charging efficiency of the power strips.

To achieve the foregoing objective, the intelligent charging device has multiple power strips, a display unit, a memory unit, a power supply module, and a control unit.

Each power strip has a relay.

The display unit displays irregularity information.

The memory unit stores and records multiple load signals acquired from the multiple power strips and a maximum load threshold.

The power supply module is electrically connected to the multiple power strips, the display unit and the memory unit to supply power thereto.

The control unit is electrically connected to the multiple power strips, the display unit, the memory unit and the power supply module, turns on or off the multiple power strips by activating or deactivating the respective relays of the multiple power strips, receives the load signal of each power strip, performs a charging schedule configuration to generate a charging demand sequence of the multiple power strips for charging in multiple charging schedules of a charging cycle corresponding to a count of the multiple power strips, calculates a charging time for each charging schedule of the charging cycle according to the charging demand sequence and the multiple load signals of the multiple power strips, and instructs the multiple power strips to charge according to the charging demand sequence and the charging time.

From the foregoing intelligent charging device, the control unit is connected to the power strips, the display unit, the memory unit, and the power supply module, activates and deactivates the relays of the power strips, receives the load signals from the power strips, determines if the load signals are abnormal and displays irregularity information on the display unit, configures a charging demand sequence according to the order of the decreasing magnitude of the load signals and the power strip combinations corresponding to the charging schedules of a charging cycle, and allocates a charging time of the charging cycle to the power strips in each power strip combination for the power strips in each power strip combination to charge. Accordingly, the intelligent charging device ensures that power strips with large charging demand have higher priority to charge and thus enhances charging efficiency of the power strips.

Other objectives, advantages and novel features of the invention will become more apparent from the following detailed description when taken in conjunction with the accompanying drawings.

DETAILED DESCRIPTION OF THE INVENTION

Figure 1:
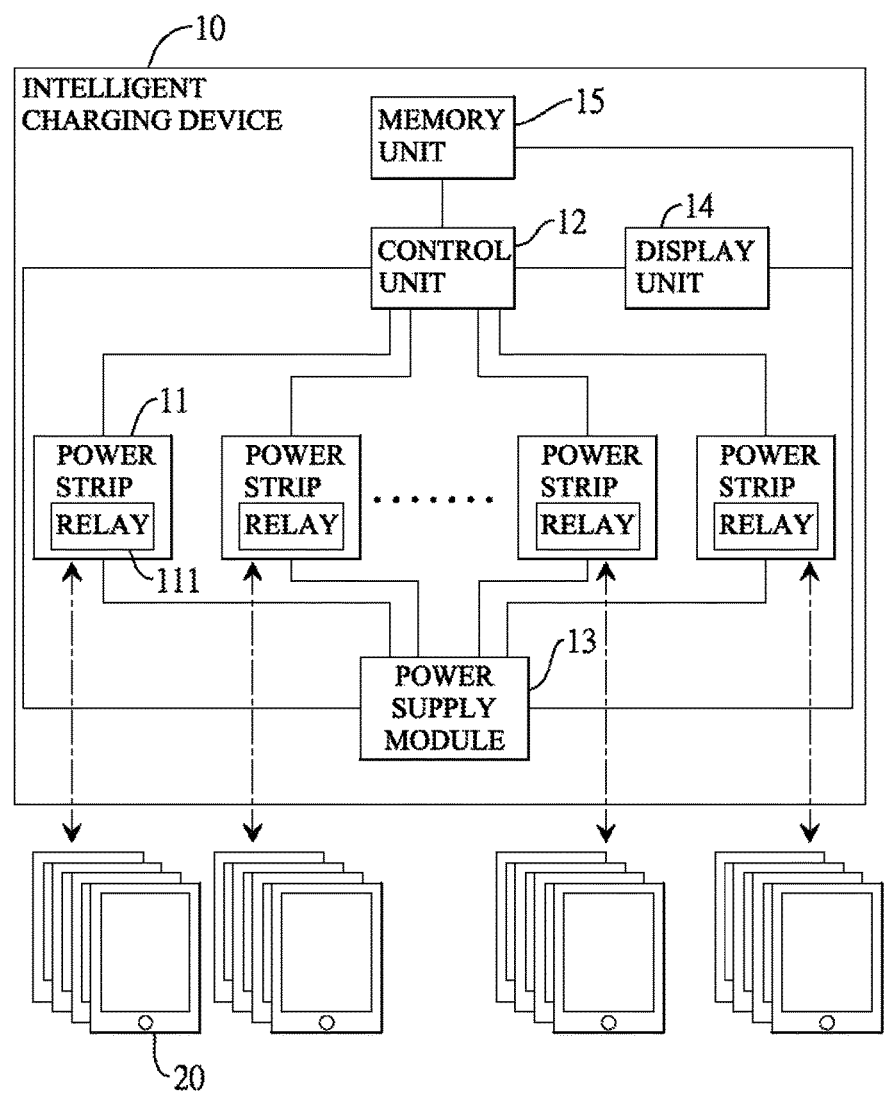
FIG. 1 is a functional block diagram associated with a system architecture of an intelligent charging device in accordance with the present invention.

With reference to FIG. 1, an intelligent charging device 10 in accordance with the present invention is connected to multiple groups of digital devices to simultaneously charge the digital devices. Each group of digital devices includes multiple digital devices 20. The multiple digital devices 20 may be a combination of a mobile phone, a tablet PC, a chromebook, a notebook computer and the like. The group of digital devices can be expandable in configuration and can be simultaneously charged.

The intelligent charging device 10 includes multiple power strips 11, a control unit 12, a power supply module 13, a display unit 14 and a memory unit 15. The control unit 12 is electrically connected to the multiple power strips 11, the power supply module 13, the display unit 14 and the memory unit 15. The power supply module 13 is electrically connected to the multiple power strips 11, the display unit 14 and the memory unit 15 to supply power thereto for operation.

Each power strip 11 has a relay 111. When each power strip 11 is electrically connected to the digital devices 20 in one of the groups of digital devices, the control unit 12 controls the relay 111 of the power strip 11 for turning on or off the power strip 11, and receives a load signal indicative of a charge current provided from the power strip 11. When receiving the load signals of the multiple power strips 11, the control unit 12 first performs a charging schedule configuration to generate a charging demand sequence of the multiple power strips 11 for charging in multiple charging schedules of a charging cycle corresponding to a count of the multiple power strips 11 according to a decreasing order of the load signals from the multiple power strips 11 in magnitude.

In the charging schedule configuration, the control unit 12 further determines a power strip combination in each charging schedule of the charging cycle according to the charging demand sequence and the load signals from the multiple power strips 11, to meet a condition that the power strip combination at least includes a corresponding power strip assigned by the charging demand sequence for the charging schedule and a sum of the magnitude of the load signals of all the power strips 11 of the power strip combination is a value closest to but not greater than a maximum load threshold. The control unit 12 further calculates a charging time for each charging schedule in the charging cycle according to the time required for charging in each charging cycle and a ratio of the magnitude of the load signal of the power strip assigned in the charging schedule based on the charging demand sequence to a total value of the magnitude of the load signals of the multiple power strips 11. Each charging cycle may last for multiple time units, and each time unit lasts for multiple seconds or multiple minutes. After the charging time for all charging schedules in the charging cycle is calculated, the control unit 12 activates the relay 111 of each power strip 11 of the power strip combination in each charging schedule of the charging cycle to charge the digital devices connected to the power strip 11 with a charging time for the charging schedule.

The maximum load threshold is pre-defined and serves to determine if the load signals from the power strips 11 are abnormal and thus avoids danger arising from the overload of the power distribution system. If any of the load signals exceeds the maximum load threshold, a contingency measure is immediately taken to alert users through an irregularity notice displayed on the display unit 14 and stop charging immediately.

To explain how the intelligent charging device 10 is operated for the power strips to charge, an example is given as follows. Suppose that there are four power strips R1~R4, four charging schedules S1~S4 of a charging cycle, and a pre-defined maximum load threshold. After the intelligent charging device 10 is powered on, the control unit 12 sequentially activates the relays of the four power strips R1~R4 to receive the load signal of each power strip R1~R4. When the control unit 12 determines that the magnitude of the load signal exceeds the maximum load threshold, the control unit 12 instructs the display unit 14 to display an irregularity message and instructs the intelligent charging device 10 to stop charging immediately. After the cause of irregularity is removed, the control unit 12 instructs the intelligent charging device 10 to start charging again. In the present embodiment, the maximum load threshold may be a maximum current threshold, and the load signals may be current values.

After the current values of the four power strips R1~R4 are received by the control unit 12, the control unit 12 generates the charging demand sequence by aligning the current values of the four power strips R1~R4 in a decreasing order with the power strip with the largest current value as R1st, the power strip with the second largest current value as R2nd, the power strip with the third largest current value as R3rd, and the power strip with the fourth largest current value as R4th. The four aligned power strips R1st, R2nd, R3rd, R4th respectively correspond to the four charging schedules S1~S4. After the charging demand sequence is determined, the control unit 12 sequentially assigns each of the four aligned power strips R1st, R2nd, R3rd, R4th as one member of the power strip combination for the corresponding charging schedule S1~S4 of the charging cycle. When determining that the current value of the member in the power strip combination for any charging schedule S1, S2, S3 S4 is less than the maximum current threshold, the control unit 12 continuously assigns one of the unassigned power strips at a time with the largest current value among the unassigned power strip as a new member to the power strip combination for the charging schedule S1, S2, S3 S4 until a sum of the current values of all the members of the power strip combination is a maximum value that is not greater than the maximum current threshold. The control unit 12 further calculates charging time for each charging schedule according to a multiplication of time for a charging cycle and a ratio of the current value of a corresponding aligned power strip R1st, R2nd, R3rd, R4th to a total current value of the four power strips R1~R4. During the charging cycle, the control unit 12 checks if the current value of each power trip R1~R4 exceeds the maximum current threshold at pre-defined intervals. If so, the control unit 12 deactivates all the relays and performs a process of inspecting all load signals. After confirming that the charging time for all the charging schedules of the charging cycle is finished, the control unit 12 repeats the following procedures in determining the charging demand sequence, the power strip combination, and the charging time for the charging schedule for a next charging cycle according to the newly received current values from the power strips R1~R4.

Furthermore, some of the following parameters are given to facilitate understanding of the foregoing scenario. The maximum current threshold is defined as 8 A. There are four power strips R1~R4. Each charging cycle has four charging schedules S1~S4 and includes multiple time units. The time unit can be set as at least one second or minute. The nonzero portion after the decimal point of the multiplication of the time for the charging cycle (in time unit) and the ratio of the current value of each aligned power strip determined in the charging demand sequence to the total current value of the power strips R1~R4 for a corresponding charging schedule S1~S4 is rounded up to one. The following table shows the current value acquired from the power strips R1~R4 and the charging demand sequence.

|  | Power strip | | | |
|---|---|---|---|---|
|  | R1 | R2 | R3 | R4 |
| Current value | 7 A | 8 A | 1 A | 5 A |
| Charging demand sequence | R2nd | R1st | R4th | R3rd |

Suppose that a charging cycle has 12 time units, and each time unit is 5 minutes.

| Charging sequence | Power strip combination | Total current of power strip combination | Charging time |
|---|---|---|---|
| S1 | R1st | R2 = 8 A | S1time = 25 min |
| S2 | R2nd + R4th | R1 + R3 = 8 A | S2time = 20 min |
| S3 | R3rd + R4th | R4 + R3 = 6 A | S3time = 15 min |
| S4 | R4th + R2nd | R3 + R1 = 8 A | S4time = 5 min |

S1time~S4time in the above table represent the charging time allocated to the respective charging schedules S1~S4. The charging time for the charging schedules S1~S4 can be calculated as follows according to the aligned power strips R1st~R4th determined in the charging demand sequence, the power strip combination and the current values of the power strips R1~R4.

$C$total (Total current value of $R1$~$R4$)=7+8+1+5=21 A $S1$unit=(Current value of $R1$st×time for charging cycle)/$C$total=(8×12)/21=4.75≈5

$S1$ time=$S1$unit×5 min=25 min $S2$unit=(Current value of $R2$nd×time for charging cycle)/$C$total=(7×12)/21=4

$S2$ time=$S2$unit×5 min=20 min $S3$unit=(Current value of $R3$rd×time for charging cycle)/$C$total=(5×12)/21=2.85≈3

$S3$ time=$S3$unit×5 min=15 min $S4$unit=(Current value of $R4$th×time for charging cycle)/$C$total=(1×12)/21=0.57≈1

$S4$ time=$S4$unit×5 min=5 min

After the charging time for the charging schedules is obtained, each of the power strips in the power strip combination of each charging schedule can charge digital devices connected thereto for a corresponding charging time.

Figure 2:
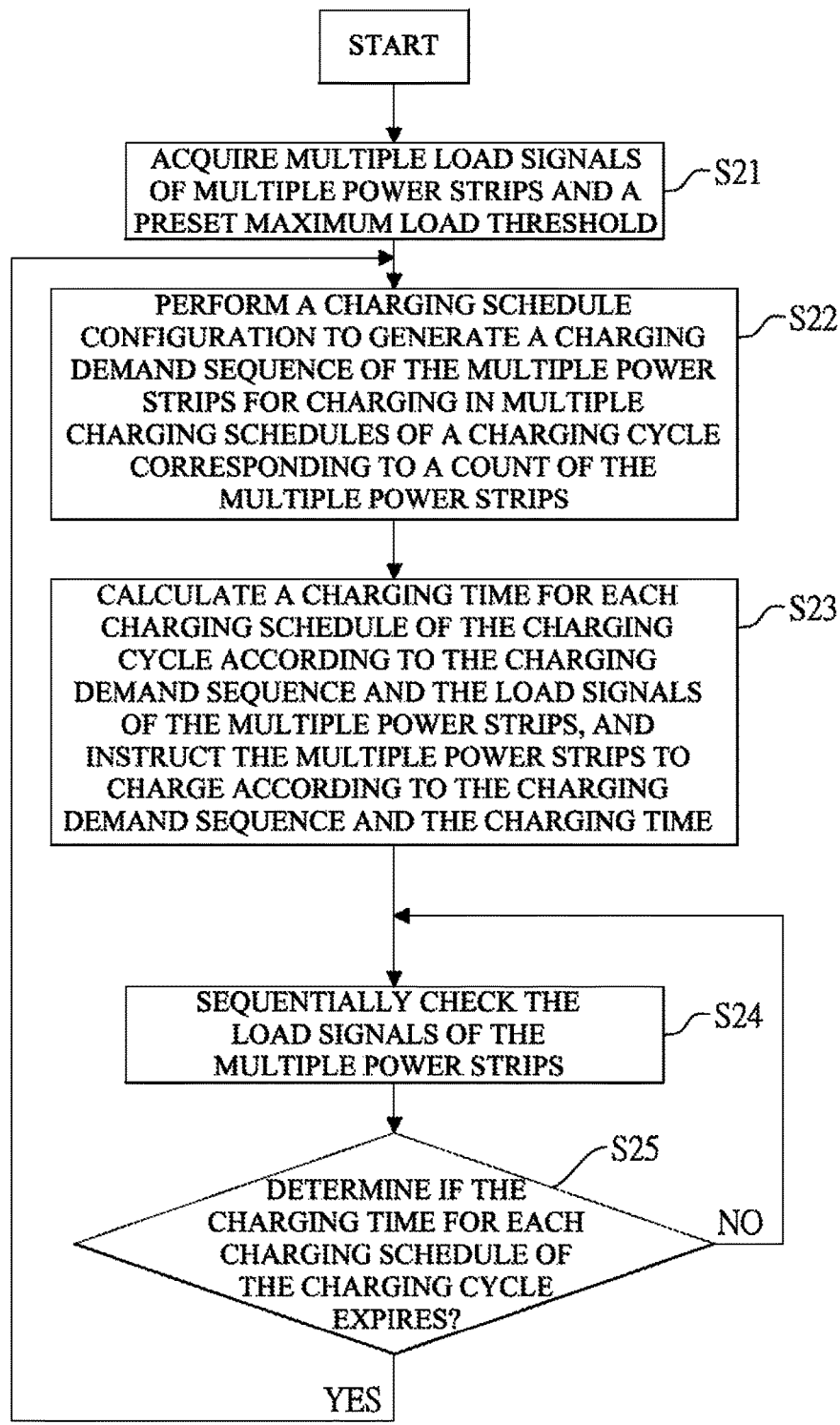
FIG. 2 is a flow diagram of a charging schedule control method in accordance with the present invention.

With reference to FIG. 2, a charge scheduling control method can be concluded from the intelligent charging device 10 in the foregoing embodiment. The control unit 12 of the intelligent charging device 10 is connected to the multiple relays 111 of the multiple power strips 11 to turn on or off the relays 111. The charge scheduling control method is controlled by the control unit 12 and has the following steps.

Step S21: Acquire multiple load signals of the multiple power strips 11 and a preset maximum load threshold.

Step S22: Perform a charging schedule configuration to generate a charging demand sequence of the multiple power strips 11 for charging in multiple charging schedules of a charging cycle corresponding to a count of the multiple power strips 11.

Step S23: Calculate a charging time for each charging schedule of the charging cycle according to the charging demand sequence and the load signals of the multiple power strips 11, and instruct the multiple power strips 11 to charge according to the charging demand sequence and the charging time.

Step S24: Sequentially check the load signals of the multiple power strips 11.

Step S25: Determine if the charging time for each charging schedule of the charging cycle expires. If positive, resume step S22. Otherwise, resume the step S24.

Figure 3:
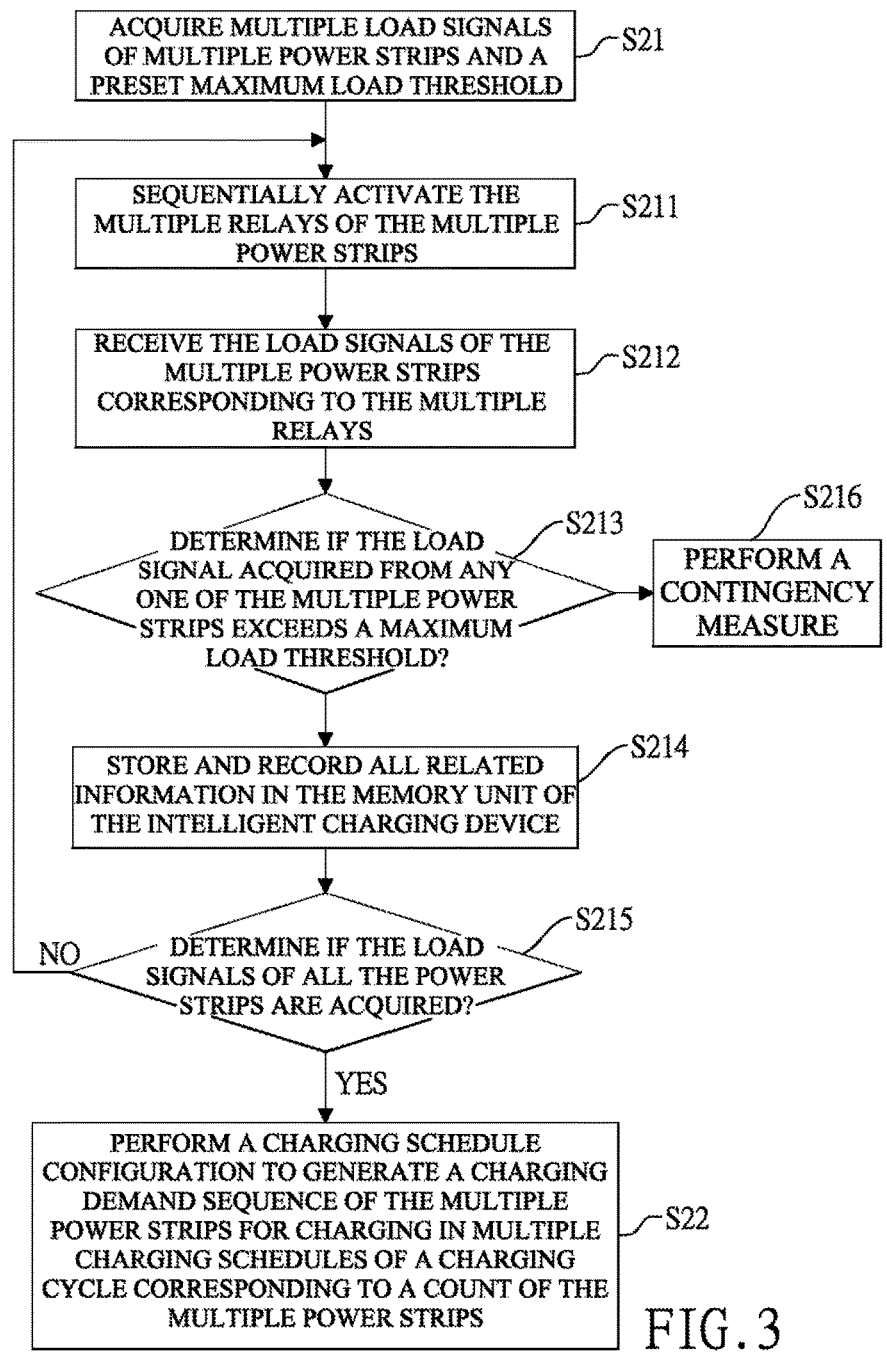
FIG. 3 is a flow diagram of a process of acquiring and inspecting load signals of power strips of the method in FIG. 2.

With reference to FIG. 3, step S21 further includes a process of acquiring and inspecting all load signals of the power strips, and includes the following steps.

Step S211: Sequentially activate the multiple relays of the multiple power strips.

Step S212: Receive the load signals of the multiple power strips 111 corresponding to the multiple relays.

Step S213: Determine if the load signal acquired from any one of the multiple power strips exceeds a maximum load threshold. If negative, perform step S214. Otherwise, perform step S216.

Step S214: Store and record all related information in the memory unit 15 of the intelligent charging device 10.

Step S215: Determine if the load signals of all the power strips are acquired. If positive, resume the foregoing step S22. Otherwise, resume step S211.

Step S216: Perform a contingency measure. In the present embodiment, the contingency measure displays irregularity information on the display unit 14 to alert users, stops the multiple power strips from charging, and terminates execution of the method.

Figure 4:
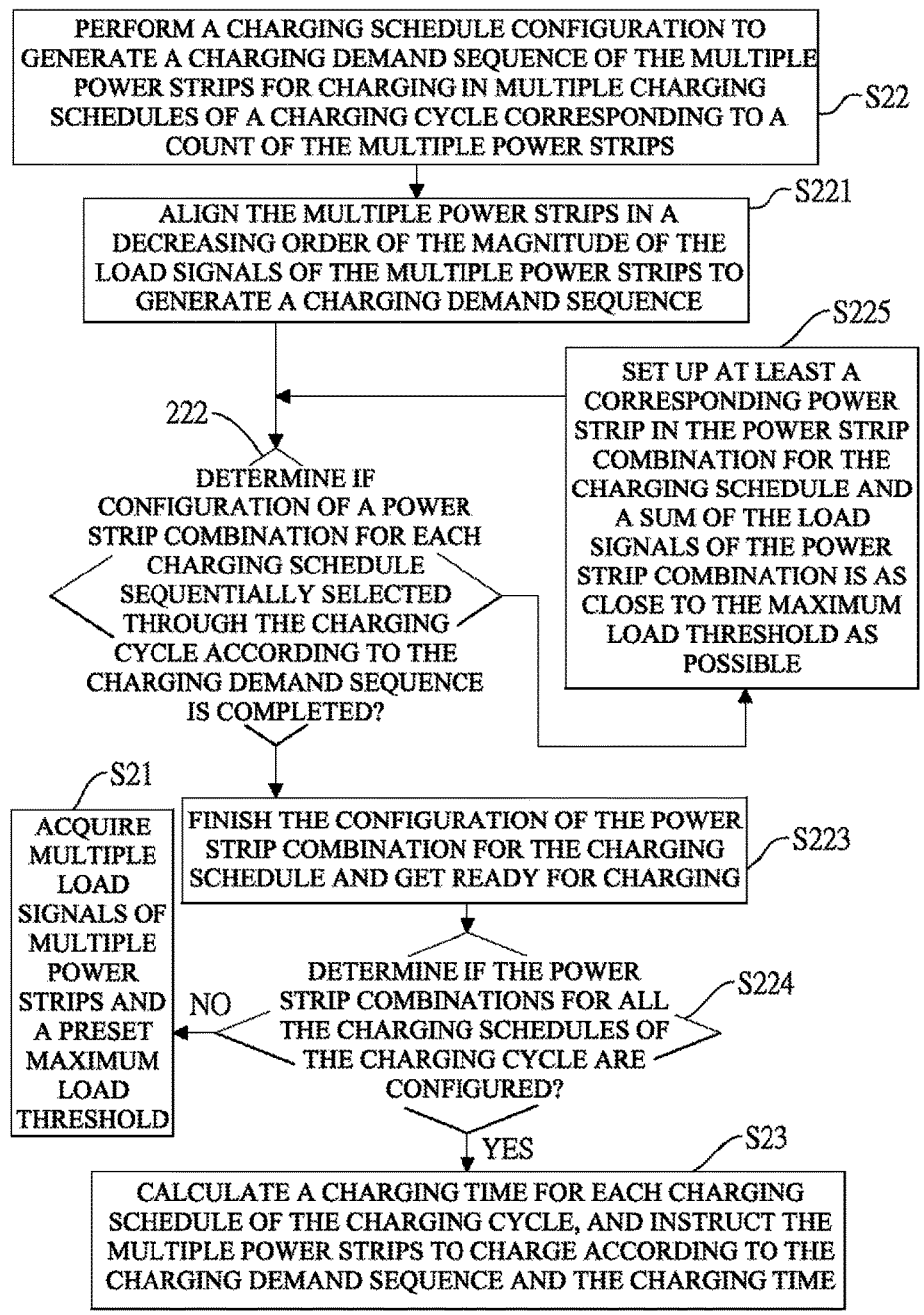
FIG. 4 is a flow diagram of a charging schedule configuration of the method in FIG. 2.

With reference to FIG. 4, step S22 further has the following steps associated with the charging schedule configuration.

Step S221: Align the multiple power strips 11 in a decreasing order of the magnitude of the load signals of the multiple power strips 11 to generate a charging demand sequence.

Step S222: Determine if configuration of a power strip combination for each charging schedule sequentially selected through the charging cycle according to the charging demand sequence is completed. If positive, perform step S223. Otherwise, perform step S225 and return to Step S222.

Step S223: Finish the configuration of the power strip combination for the charging schedule and get ready for charging.

Step S224: Determine if the power strip combinations for all the charging schedules of the charging cycle are configured. If positive, perform step S23. Otherwise, perform step S222. If positive, perform step S21. Otherwise, perform Step S23.

Step S225: Set up at least a corresponding power strip assigned by the charging demand sequence in the power strip combination for a corresponding charging schedule and a sum of the magnitude of the load signals of all the power strips of the power strip combination is a value closest to but not greater than the maximum load threshold.

Figure 5:
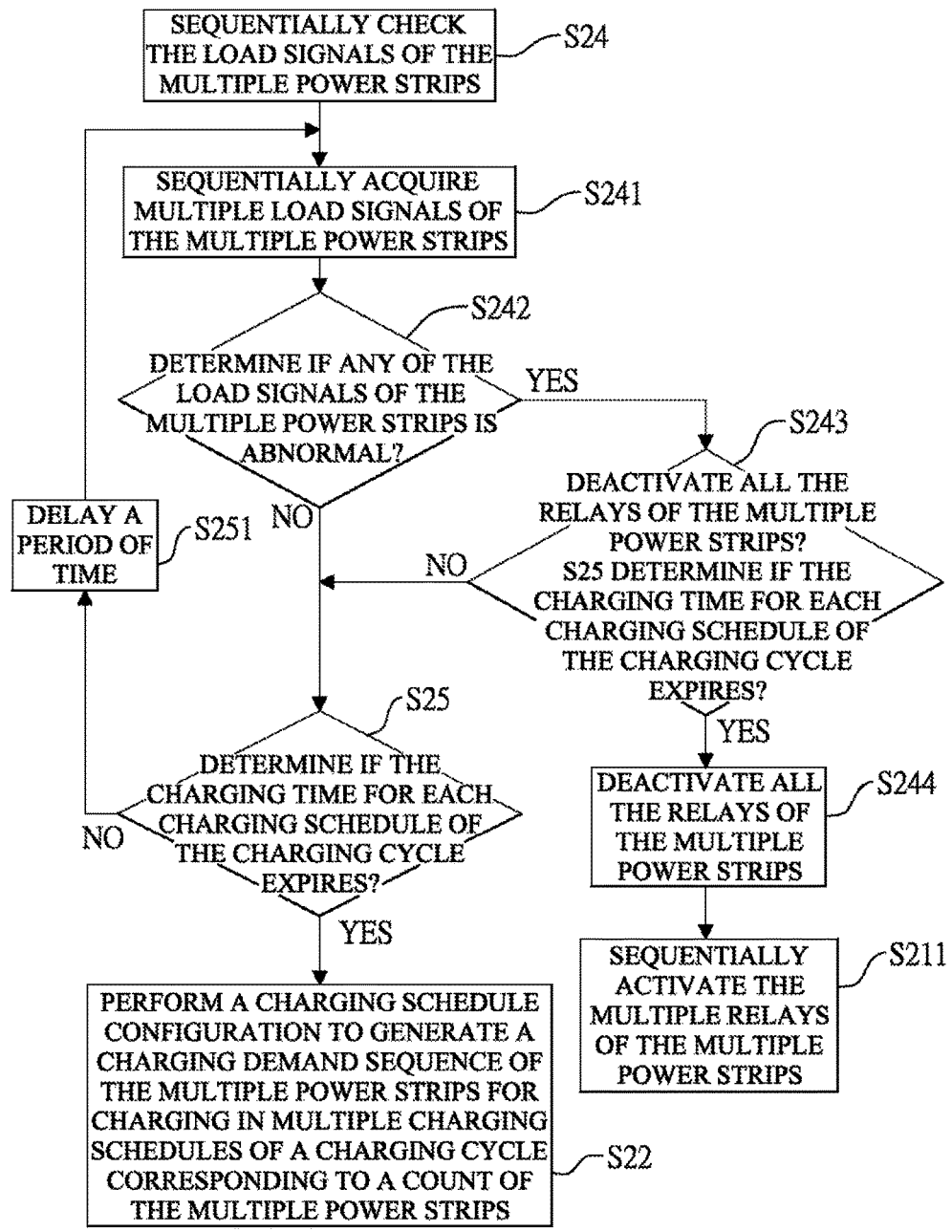
FIG. 5 is a flow diagram of a process of checking all the load signals of multiple power strips in the method in FIG. 2.

With reference to FIG. 5, step S24 associated with a process of checking all the load signals of the multiple power strips has the following steps.

Step S241: Sequentially acquire multiple load signals of the multiple power strips 11.

Step S242: Determine if any of the load signals of the multiple power strips 11 is abnormal. In the present embodiment, when any load signal increases in magnitude, it indicates that the load signal is abnormal. Otherwise, it indicates that the load signal is normal. If any of the load signals is abnormal, perform step S243. Otherwise, perform step S25.

Step S243: Determine if the load signal exceeds the preset maximum load threshold. If positive, perform step S244 and then step S211. Otherwise, perform step S25.

Step S244: Deactivate all the relays of the multiple power strips.

Step S25 serves to determine if the charging time for each charging schedule of the charging cycle expires. If the determination result in step S25 is positive, perform step S22. Otherwise, perform step S251 to delay a period of time, such as one second. After the period of time expires, perform step S241.

Given the foregoing intelligent charging device 10 and the charge scheduling control method in accordance with the present invention, the multiple power strips 11 can perform charging according to the charging demand sequence and the allocated charging time, the power strips can be instructed to charge digital devices connected thereto according to a charging demand sequence with the power strips arranged in an order of decreasing magnitude of the load signals, and the charging schedule configuration enhances charging efficiency and optimizes charging time allocation to effectively lower the charging time required for multiple digital devices connected to the power strips, and also reduce users' time for waiting to enhance operational convenience. In particular, the present invention is advantageous in at least one power strip charging at any time to further maximize utilization and efficiency of the intelligent charging device 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A charge scheduling control method of an intelligent charging device, wherein the intelligent charging device has a control unit and multiple power strips, each power strip has a relay connected to the control unit, and the control unit activates or deactivates the relays of the multiple power strips, the method is performed by the control unit of the intelligent charging device and comprising steps of:
   acquiring multiple load signals of the multiple power strips and a maximum load threshold;
   aligning the multiple power strips in a decreasing order of magnitude of the load signals of the multiple power strips to generate a charging demand sequence with the aligned power strips assigned therein for charging in multiple charging schedules of a charging cycle, wherein a count of the multiple charging schedules corresponds to a count of the multiple power strips;
   configuring a power strip combination for each charging schedule sequentially selected through the charging cycle according to the charging demand sequence, wherein each power strip combination for a corresponding charging schedule at least includes a corresponding power strip assigned by the charging demand sequence and a sum of the magnitude of the load signals of all the power strips of the power strip combination is a value closest to but not greater than the maximum load threshold; and
   calculating a charging time for each charging schedule of the charging cycle according to the charging demand sequence and the multiple load signals of the multiple power strips, and instructing the multiple power strips to charge according to the charging demand sequence and the charging time, wherein the charging time for each charging schedule is calculated according to a multiplication of time for the charging cycle and a ratio of a magnitude of the load signal of one of the aligned power strips assigned in the charging demand sequence for charging in the charging schedule to a total magnitude of the load signals of the multiple power strips.

2. The method as claimed in claim 1, further comprising steps of:
   sequentially checking the multiple load signals of the multiple power strips;
   determining if the charging time for all the charging schedules of the charging cycle expires;
   when the charging time of each charging schedule expires, resuming the step of acquiring multiple load signals of the multiple power strips; and when the charging time of the charging cycle does not expire, resuming the step of sequentially checking the multiple load signals.

3. The method as claimed in claim 2, wherein the step of sequentially checking the multiple load signals of the multiple power strips has steps of:
  sequentially acquiring the multiple load signals of the multiple power strips;
  determining if any of the load signals of the multiple power strips is abnormal;
  when any of the load signals is abnormal, determining if the load signal exceeds the preset maximum load threshold;
  when no load signal is abnormal or when no load signal exceeds the maximum load threshold, resuming the step of determining if the charging time for each charging schedule of the charging cycle expires;
  when the charging time for each charging schedule of the charging cycle expires, resuming the step of aligning the multiple power strips in the decreasing order of magnitude of the load signals of the multiple power strips to generate the charging demand sequence of the multiple power strips; and
  when the charging time for any charging schedule of the charging cycle does not expire, delaying a period of time, and after the period of time expires, resuming the step of sequentially acquiring the multiple load signals of the multiple power strips.

4. The method as claimed in claim 2, further comprising a step of:
  when any of the load signals exceeds the preset maximum load threshold, deactivating all the relays of the multiple power strips and resuming the step of acquiring the multiple load signals of the multiple power strips and the preset maximum load threshold.

5. The method as claimed in claim 1, wherein the step of acquiring multiple load signals of the multiple power strips and a maximum load threshold further includes steps of:
  sequentially activating the multiple relays of the multiple power strips;
  receiving the multiple load signals of the multiple power strips corresponding to the multiple relays;
  determining if the load signal acquired from any one of the multiple power strips exceeds the maximum load threshold;
  when the multiple load signals of the multiple power strips do not exceed the maximum load threshold, storing and recording the multiple load signals and the maximum load threshold;
  determining if the multiple load signals of all the power strips are acquired;
  when the multiple load signals of all the power strips are acquired, resuming the step of aligning the multiple power strips in the decreasing order of magnitude of the load signals of the multiple power strips to generate the charging demand sequence; and
  when the multiple load signals of all the power strips are not acquired, resuming the step of sequentially activating the multiple relays of the multiple power strips.

6. The method as claimed in claim 5, further comprising a step of:
  when the load signal acquired from any one of the multiple power strips exceeds the maximum load threshold, performing a contingency measure.

7. The method as claimed in claim 6, wherein the contingency measure displays irregularity information on a display unit to alert users, stops the multiple power strips from charging, and terminates execution of the method.

8. The method as claimed in claim 1, after the step of configuring the power strip combination for each charging schedule, further comprising steps of:
  determining if the power strip combinations for all the charging schedules of the charging cycle are configured;
  when the power strip combinations for all the charging schedules are configured, resuming the step of calculating the charging time for each charging schedule of the charging cycle; and
  when the power strip combinations for all the charging schedules are not completely configured, resuming the step of configuring the power strip combination for each charging schedule sequentially selected through the charging cycle.

9. An intelligent charging device, comprising:
  multiple power strips, each having a relay;
  a display unit displaying irregularity information;
  a memory unit storing and recording multiple load signals acquired from the multiple power strips and a maximum load threshold;
  a power supply module electrically connected to the multiple power strips, the display unit and the memory unit to supply power thereto;
  a control unit electrically connected to the multiple power strips, the display unit, the memory unit and the power supply module, turning on or off the multiple power strips by activating or deactivating the respective relays of the multiple power strips, receiving the load signal of each power strip, aligning the multiple power strips in a decreasing order of magnitude of the load signals of the multiple power strips to generate a charging demand sequence with the aligned power strips assigned therein for charging in multiple charging schedules of a charging cycle, configuring a power strip combination for each charging schedule sequentially selected through the charging cycle according to the charging demand sequence, calculating a charging time for each charging schedule of the charging cycle according to the charging demand sequence and the multiple load signals of the multiple power strips, and instructing the multiple power strips to charge according to the charging demand sequence and the charging time, wherein a count of the multiple charging schedules corresponds to a count of the multiple power strips, and the charging time for each charging schedule is calculated according to a multiplication of time for the charging cycle and a ratio of a magnitude of the load signal of one of the aligned power strips assigned in the charging demand sequence for charging in the charging schedule to a total magnitude of the load signals of the multiple power strips;
  wherein each power strip combination for a corresponding charging schedule at least includes a corresponding power strip assigned by the charging demand sequence and a sum of the magnitude of the load signals of all the power strips of the power strip combination is a value closest to but not greater than the maximum load threshold.

10. The intelligent charging device as claimed in claim 9, wherein the control unit further sequentially checks the multiple load signals of the multiple power strips and determines if the charging time for each charging schedule of the charging cycle expires, performs the aligning of the multiple power strips in the decreasing order of magnitude of the load signals of the multiple power strips to generate the charging demand sequence when the charging time expires, and sequentially checks the multiple load signals of the multiple power strips when the charging time does not expire.

11. The intelligent charging device as claimed in claim 10, wherein the control unit sequentially acquires multiple load signals of the multiple power strips, determines if any of the load signals of the multiple power strips is abnormal, determines if the load signal exceeds the preset maximum load threshold when any of the load signals is abnormal, determines if the charging time for each charging schedule of the charging cycle expires when no load signal is abnormal or when no load signal exceeds the maximum load threshold, aligns the multiple power strips in the decreasing order of magnitude of the load signals of the multiple power strips to generate the charging demand sequence of the multiple power strips when the charging time for each charging schedule of the charging cycle expires, delays a period of time when the charging time for any charging schedule of the charging cycle does not expire, and sequentially acquires the multiple load signals of the multiple power strips after the period of time expires.

12. The intelligent charging device as claimed in claim 9, wherein the control unit sequentially activates the multiple relays of the multiple power strips, receives the multiple load signals of the multiple power strips corresponding to the multiple relays, determines if the load signal acquired from any one of the multiple power strips exceeds the maximum load threshold, stores and records the multiple load signals and the maximum load threshold when the multiple load signals of the multiple power strips do not exceed the maximum load threshold, determines if the multiple load signals of all the power strips are acquired, aligns the multiple power strips in the decreasing order of magnitude of the load signals of the multiple power strips to generate the charging demand sequence when the multiple load signals of all the power strips are acquired, and sequentially activates the multiple relays of the multiple power strips when the multiple load signals of all the power strips are not acquired.

13. The intelligent charging device as claimed in claim 12, wherein the control unit performs a contingency measure when the load signal acquired from any one of the multiple power strips exceeds the maximum load threshold.

14. The intelligent charging device as claimed in claim 13, wherein the contingency measure displays the irregularity information on the display unit to alert users, and stops the multiple power strips from charging.

15. The intelligent charging device as claimed in claim 9, wherein after configuring the power strip combination for each charging schedule, the control unit determines if the power strip combinations for all the charging schedules of the charging cycle are configured, calculates the charging time for each charging schedule of the charging cycle when the power strip combinations for all the charging schedules are configured, and configures the power strip combination for each charging schedule sequentially selected through the charging cycle when the power strip combinations for all the charging schedules are not completely configured.

16. The intelligent charging device as claimed in claim 9, wherein the control unit deactivates all the relays of the multiple power strips and acquires the multiple load signals of the multiple power strips and the preset maximum load threshold when any of the load signals exceeds the preset maximum load threshold.

\* \* \* \* \*